United States Patent
Boehm et al.

(10) Patent No.: US 8,199,316 B2
(45) Date of Patent: Jun. 12, 2012

(54) DEVICE AND METHOD FOR TRACKING THE MOVEMENT OF A TOOL OF A HANDLING UNIT

(75) Inventors: Stefan Boehm, Schwuelper (DE); Mark Hellmanns, Wuerselen (DE); Klaus Dilger, Braunschweig (DE); Karl-Heinz Brakhage, Alsdorf (DE)

(73) Assignee: LKT GmbH, Aachen (DE)

( * ) Notice: Subject to any disclaimer, the term of this patent is extended or adjusted under 35 U.S.C. 154(b) by 306 days.

(21) Appl. No.: 12/161,227

(22) PCT Filed: Feb. 8, 2007

(86) PCT No.: PCT/DE2007/000248
§ 371 (c)(1),
(2), (4) Date: Jul. 19, 2010

(87) PCT Pub. No.: WO2007/090388
PCT Pub. Date: Aug. 16, 2007

(65) Prior Publication Data
US 2010/0298963 A1 Nov. 25, 2010

(30) Foreign Application Priority Data
Feb. 10, 2006 (DE) .......................... 10 2006 006 475

(51) Int. Cl.
*G01B 3/08* (2006.01)
(52) U.S. Cl. ......... 356/3.1; 356/3.01; 356/4.01; 356/4.1
(58) Field of Classification Search ........ 356/3.01–3.15, 356/6–22, 28, 28.5, 139.01–139.1
See application file for complete search history.

(56) References Cited

U.S. PATENT DOCUMENTS

| | | | |
|---|---|---|---|
| 2,830,487 A | 4/1958 | Griffith | |
| 3,687,556 A | 8/1972 | Price et al. | |
| 4,268,167 A | 5/1981 | Alderman | |
| 4,818,107 A | 4/1989 | Ono et al. | |
| 5,666,202 A | 9/1997 | Kyrazis | |
| 5,742,394 A | 4/1998 | Hansen | |
| 2007/0024845 A1* | 2/2007 | Essling et al. | 356/141.4 |

FOREIGN PATENT DOCUMENTS

| | | |
|---|---|---|
| DE | 3629689 A1 | 3/1987 |
| DE | 3629689 A1 | 12/1987 |

(Continued)

*Primary Examiner* — Luke Ratcliffe
(74) *Attorney, Agent, or Firm* — Whitham Curtis Christofferson & Cook, PC

(57) ABSTRACT

A description is given of a device (1) for tracking the movement of a tool of a handling unit (2), having at least one directional radiator (5) that can be aligned with the tool and be tracked, and a signal evaluation unit (4) for determining the movement.

The directional radiators (5) have actuators for aligning the directional beam (6) at adjustable angles with reference to a fixed spatial plane, and angle sensors for determining the current directional beam angle with reference to the spatial plane, the angle sensors being connected to the signal evaluation unit (4). Directional beam sensors (7) for detecting the directional beam (6) are arranged with a fixed reference to the tool and movably therewith, the directional beam sensors (7) being connected to the signal evaluation unit (4). The signal evaluation unit (4) is set up for tracking the directional beams (6) of the at least one directional radiator (5) onto an assigned, moving directional beam sensor (7), and for determining the arbitrary movement of the tool in three-dimensional space as a function of the directional beam angles.

24 Claims, 4 Drawing Sheets

FOREIGN PATENT DOCUMENTS

| | | |
|---|---|---|
| DE | 301 529 A7 | 7/1992 |
| DE | 19752290 A1 | 11/1997 |
| DE | 19651543 | 7/1998 |
| DE | 198 24 904 A1 | 11/1998 |
| DE | 19752290 | 6/1999 |
| DE | 198 58 621 A1 | 7/2000 |
| DE | 1525954 A2 | 10/2004 |
| DE | EP1525954 * | 4/2005 |
| EP | 0 997 579 A2 | 10/1999 |
| EP | 0997579 A2 | 10/1999 |
| EP | 1525954 | 4/2005 |
| WO | PCT/US95/12013 | 3/1996 |
| WO | WO02/10681 A1 | 2/2002 |
| WO | WO 0210681 | 2/2002 |

* cited by examiner

DEVICE AND METHOD FOR TRACKING THE MOVEMENT OF A TOOL OF A HANDLING UNIT

The invention relates to a device for tracking the movement of a tool of a handling unit having at least one directional radiator that can be aligned with the tool and be tracked, and a signal evaluation unit for determining the movement, in which the directional radiators have actuators for aligning the directional beam at adjustable angles with reference to a fixed spatial plane, and angle sensors for determining the current directional beam angle with reference to the spatial beam plane, and the angle sensors are connected to the signal evaluation unit, direction beam sensors for detecting the directional beam are arranged with a fixed reference to the tool and movably therewith, and are connected to the signal evaluation unit, and the signal evaluation unit is set up for tracking the directional beam of the at least one directional radiator onto an assigned, moving directional beam sensor, and for determining the arbitrary movement of the tool in three-dimensional space as a function of the directional beam angles.

The invention further relates to a method for tracking the movement of a tool of a handling unit.

Handling units in the form of machines or devices that are automatic or hand guided at least partially (that is to say also completely, if appropriate) are sufficiently well known, for example in the form of robots, mounting aids, adhesive application guns etc.

In order to determine the speed of a moving body of the handling unit in a contactless fashion and without interaction with the surroundings, use is made of conventional inertial systems that normally consist of acceleration sensors and rate of rotation sensors as well as, in addition, also sometimes magnetic field sensors.

DD 301 529 A7 describes an arrangement for calibrating optical sensors in inertial systems that have possibly changed in position or alignment during operation owing to different effects.

DE 196 51 543 C1 discloses an inertial system that carries out satellite-based position finding in order to improve long term accuracy. A system similar thereto is described in WO 96-108730 A1. Here, two satellite navigation signal receivers and two antennas are used to determine the course.

Errors are added thereto because of the property of inertial systems of not directly measuring the speed, but of clearing the latter from the integration of acceleration sensor signals. The latter permit only a relatively short time for determining the speed before the added error becomes too large. The error can be minimized by improving the sensors, but it can never be completely avoided owing to the physical/mathematical relationships. Thus, signal drift occurs through temperature influences or a zero shift. Rounding errors are also a problem because of the finite accuracy in the customary numerical calculation.

In addition, the possible applications of inertial measuring systems are limited by the measuring accuracy of their inertial sensors (angular and linear accelerometers). In order to raise the measuring accuracy, the inertial sensors and inertial systems are calibrated in special test apparatuses before delivery and at specified maintenance deadlines. Those parameters of the sensor characteristic that vary stochastically during switching on and operation can, however, not be calibrated in advance, and lead to corresponding measuring errors.

A method for detecting and correcting measuring errors of inertial systems in unsupported inertial operation in the case of which no external supporting references are available is described in DE 198 24 904 A1.

In order to enable the use of moderately priced mass produced inertial sensors for sufficiently accurate measurement of accelerations and angular velocities, DE 198 58 621 C2 proposes firstly to measure the inertial sensors as a whole on a test device in an adjustment operation. In this case, errors relating to offsetting, installation location and scaling are acquired in coefficients of coupling matrices of the inertial sensors and converted into correction values. The latter can then be used in operation to improve the accuracy of the measured values of the inertial sensors.

In addition to an inertial system, there are also known concepts in which image sensors such as, for example a camera, are used to determine the position of a tool, a robot or a workpiece with the aid of image evaluation methods. The reliability and the accuracy are restricted by the frequently undefined surroundings, by the casting of shadows and the requisite high computing speed for image evaluation.

DE 197 52 290 A1 discloses a method and a device of measuring of position and/or orientation cooperating machine units. The aim is to use a sensor that is arranged on a fixed measuring base and cooperates with sensors on a movably arranged machine column, and with a machine unit in order relatively to determine at least one of the variables of distance, position, solid angle or orientation, or a variable derived therefrom, independently of the drive axes of the machine units continuously or in intervals that are as short as possible, and without the sensors and/or the machine units being moved in their special measuring position. In addition to a first class of sensors that employ direct coordinates or changes in these coordinates with reference to the reference systems used such as, for example, length and angle measuring systems, contactless measuring systems such as for example, laser interferometers, it is proposed to use a second class of sensors with the aid of which point-to-point relationships of object points are taken into account among one another. These are, in particular, the distances between two points of the measuring system, and the solid angle(s) of the connecting line between the two points in the reference system used. Since the measurement of the individual sensors from the second sensor class no longer correspond to the axial movements to be measured, it is necessary to calculate all data of interest from the totality of measurements. This is denoted as "sensors acting in parallel". The system requires knowledge of the possible movement directions, and can fundamentally not be used to acquire arbitrary movements in three-dimensional space.

Starting from here, it is an object of the present invention to create an improved device and method for tracking the movement of a tool of a handling unit.

The object is achieved by means of a device having the features of claim 1, as well as by means of the method having the features of claim 16. Advantageous embodiments are described in the subclaims.

The tracking of the movement is combined with an inertial system with the aid of the directed beams. Accumulated errors of the inertial system can then be regularly corrected with the aid of the directional beam system. Even in the case of interruption of the directional beam, for example given spatially unfavorable conditions, the inertial system can be used for further tracking.

Preferably, at least one acceleration sensor is connected to the tool for quantitatively acquiring the acceleration and for acquiring the direction of acceleration of the tool, and is connected with a signal output to the signal evaluation unit. The signal evaluation unit is then set out for tracking the movement of the tool and/or for tracking the directional radiator as a function of the acceleration signals of the acceleration sensor.

Alternatively, or in addition, the inertial sensor can also be divided for quantitatively acquiring the rates of rotation and for acquiring the direction of rotation of the tool. The signal evaluation unit connected to the inertial sensor is then set up for tracking the movement of the tool and/or for tracking the directional radiators as a function of the rate of rotation signals of the rate of rotation sensor.

There is then preferably determination of the translatory movements of the tool as a function of the detected signals of the directional beam sensors, while the rotary movement of the tool is determined as a function of the rate of rotation signals.

The directional beam sensors and directional radiators cooperating via the signal evaluation unit can easily be used to align the directional radiator with the directional beam sensor without acquiring measured variables directly from the directional beam. All that is required to this end is an item of information from the optical beam sensor as to whether the optical beam is detected or not. When the directional beam is aligned with the directional beam sensor, it is easily possible to determine the at least one solid angle of the directional beam with reference to a fixed spatial plane with the aid of angle sensors of the directional radiator. During movement of the tool in three-dimensional space, and of the directional beam sensor arranged with reference thereto, the directional beam simply tracks the directional beam sensor without the need for further knowledge of prescribed movement axes. The directional beam angle or the change in directional beam angle can then be used for reliably and accurately tracking the movement of the tool, that is to say distance, position, solid angle or orientation or one of their derived variables, without the need for a complicated arithmetic logic unit or sensor system.

A substantial advantage of this type of movement tracking is that measuring errors are not accumulated as in the case of the inertial system.

At least one directional radiator is formed from a group of individual sensors arranged next to one another in order to be able to detect the change in direction of the tool quickly and easily for quickly tracking the directional beams onto the assigned, moving directional beam sensor. The detected directional beam is then displaced from an individual sensor onto a neighboring individual sensor as the tool moves. It is then easily possible from this and from the known spatial position of the individual sensors relative to one another to detect the direction of the change in movement of the tool in a simple way, and to track the directional radiator with the directional beam sensor. The tracking of the light beam onto an individual sensor is preferably performed at the center of the directional beam sensor, and so the surrounding individual sensors are used merely for detecting the direction of movement and for tracking.

It is preferred for at least one directional beam sensor to be formed from a photosemiconductor surface element such as, for example, a large-area photodiode, a phototransistor or an optical sensor such as, for example, a position sensitive unit (position sensitive device—PSD). A particularly simple, moderately priced and reliable embodiment of a directional beam sensor has a photosemiconductor surface element with a common anode or cathode and a plurality of cathodes or anodes respectively assigned to a surface region of the photosemiconductor surface element. In the case of such an integral photosemiconductor surface element, the individual cathodes or anodes can be used to detect the point of infringement of the directional beam on a surface region of the photosemiconductor surface element.

The device preferably has exactly one directional radiator for detecting the movement of the tool with reference to a spatial plane. It is, moreover, also conceivable to carry out a triangulation with directed radiation with the use of at least two directional radiators for detecting the movement of the tool in three-dimensional space.

For the use of more than one directional radiator, it is advantageous when the directional radiators emit mutually different directional beams such that the directional beam sensors detect the origin of the directional beams and, as a function thereof, the signal evaluation unit can carry out an activation of the assigned directional radiator for changing the directional beam angle.

The directional beams can, for example, have mutually different wavelengths, or mutually different modulations or codings.

In order to initialize the device, that is to say for the purpose of automatic target tracking, the spatial region is preferably scanned with the aid of directional beams in an alignment sequence for localizing the at least one directional beam sensor of the tool by means of the directional beams.

After the at least one directional beam has been aligned with an assigned directional beam sensor, the tracking of the movement can be carried out in the way described above.

The tracked movement of the tool can, for example, be stored in a memory for the purpose of quality assurance. Particularly in the case of hand guided mounting and processing devices, it is possible in this way to check whether the worker has complied with quality regulations. Thus, for example, it is possible to check whether all the fastening screws for the wheel rims have been mounted and tightened when mounting vehicle wheels.

The handling unit can be, for example, a partially or completely hand guided mounting tool, a manual application device such as, for example, a glue gun, a robot, a machine tool or a handling machine etc.

The invention is explained in more detail below with the aid of exemplary embodiments and of the attached drawings, in which.

Figure 1:
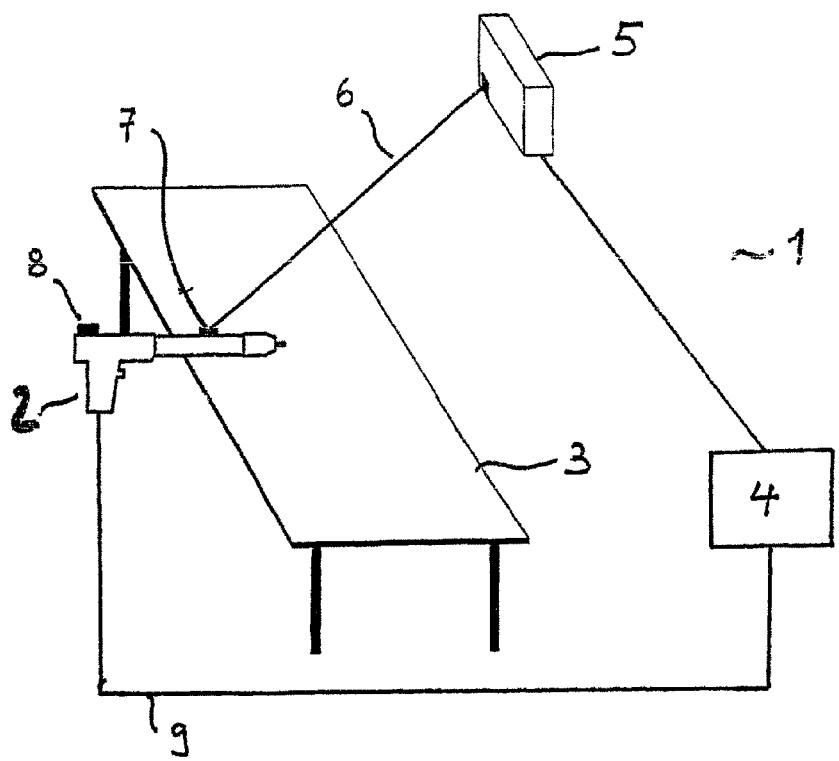
FIG. 1 shows a perspective view of a device for movement tracking of a handling unit, having an inertial sensor and a directional beam sensor as well as a directional radiator aligned with the directional beam sensor.

FIG. 1 displays a sketch of a device 1 for tracking the movement of a handling unit 2 that is used by a worker for processing workpieces (not illustrated) on a work bench 3 (not mandatory). The handling unit 2 is, for example, a manual application device such as, for example, a glue gun for applying adhesives.

The handling unit 2 is coupled via a signal evaluation unit 4 to a directional radiator 5 that emits a directed radiation 6. The directed radiation 6 can be, for example, a laser beam, a microwave radiation, a terahertz radiation or the like.

The directional radiator 5 has an actuator (not illustrated) for aligning the directional beam 6 at adjustable angles with reference to a fixed spatial plane. The spatial plane is determined by the fixed mounting position of the directional radiator 5. Also provided in the directional radiator 5 are angle sensors (not illustrated) for the purpose of determining the current directional beam angle (solid angle) of the directional beam 6 with reference to the spatial plane. Arranged on the outside of the handling unit 2 is at least one directional beam sensor 7 with the aid of which the directional beam 6 is detected.

During a movement of the tool, the displacement of the directional beam 6 is detected by the directional beam sensor 7 and passed on to the signal evaluation unit 4. The latter then activates the actuator of the directional radiator 5 in order to track the directional beam 6 onto the directional beam sensor 7. The movement of the tool can then be determined directly from the change in the directional beam angle or from the directional beam angle itself.

Furthermore, the handling unit 2 optionally has an inertial sensor 8 such as, for example an acceleration sensor, with the aid of which the movement of the handling unit 2 is likewise determined autonomously from the acceleration. This inertial sensor 8 is likewise coupled to the signal evaluation unit in order to carry out a compensation with the movement determined as a function of optical beam angles, and to avoid an accumulation of measuring errors of the inertial sensor 8.

Alternatively, or in addition to the acceleration sensor, the inertial sensor 8 can also have at least one rate of rotation sensor with the aid of which the rotation of the handling unit 2, that is to say a rotary movement, can be determined autonomously from the rate of rotation.

The device 1 illustrated can then be used to determine one of the parameters of distance, position, solid angle or orientation, or one of their derived variables, and to derive the movement of the tool therefrom.

The inertial sensor 8 is permanently fastened on the handling unit 2, whose abovenamed variables are to be determined. One or more transmitters and/or receivers are fitted as directional beam sensors 7 on the handling unit 2 in order to process the directed radiation.

Figure 2:
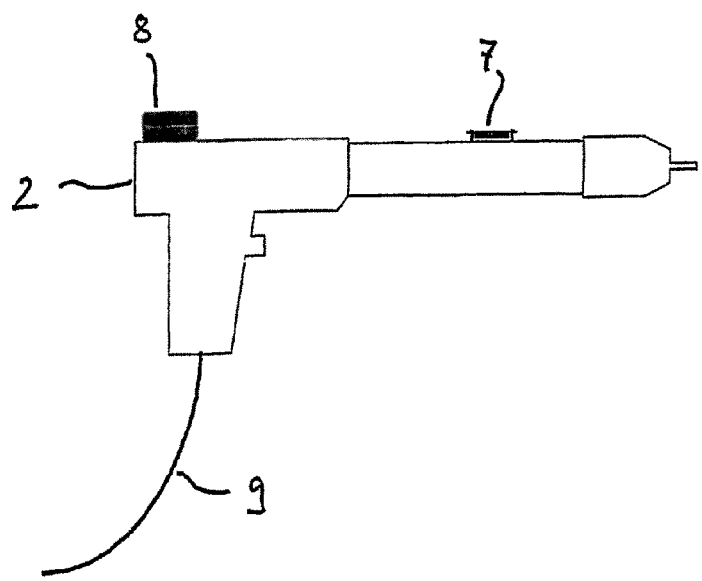
FIG. 2 shows a sketch of the handling unit from FIG. 1, in side view.

FIG. 2 displays a manual application unit as handling unit 2 in side view, as a sketch. It is clear that at least one directional beam sensor 7, and the inertial sensor 8, are fitted on the handling unit 2. The measured data, which are conducted to the signal evaluation unit 4, are conducted to the signal evaluation unit 4, for example in a wire bound fashion via a data cable 9, or optionally also in wireless fashion.

Figure 3:
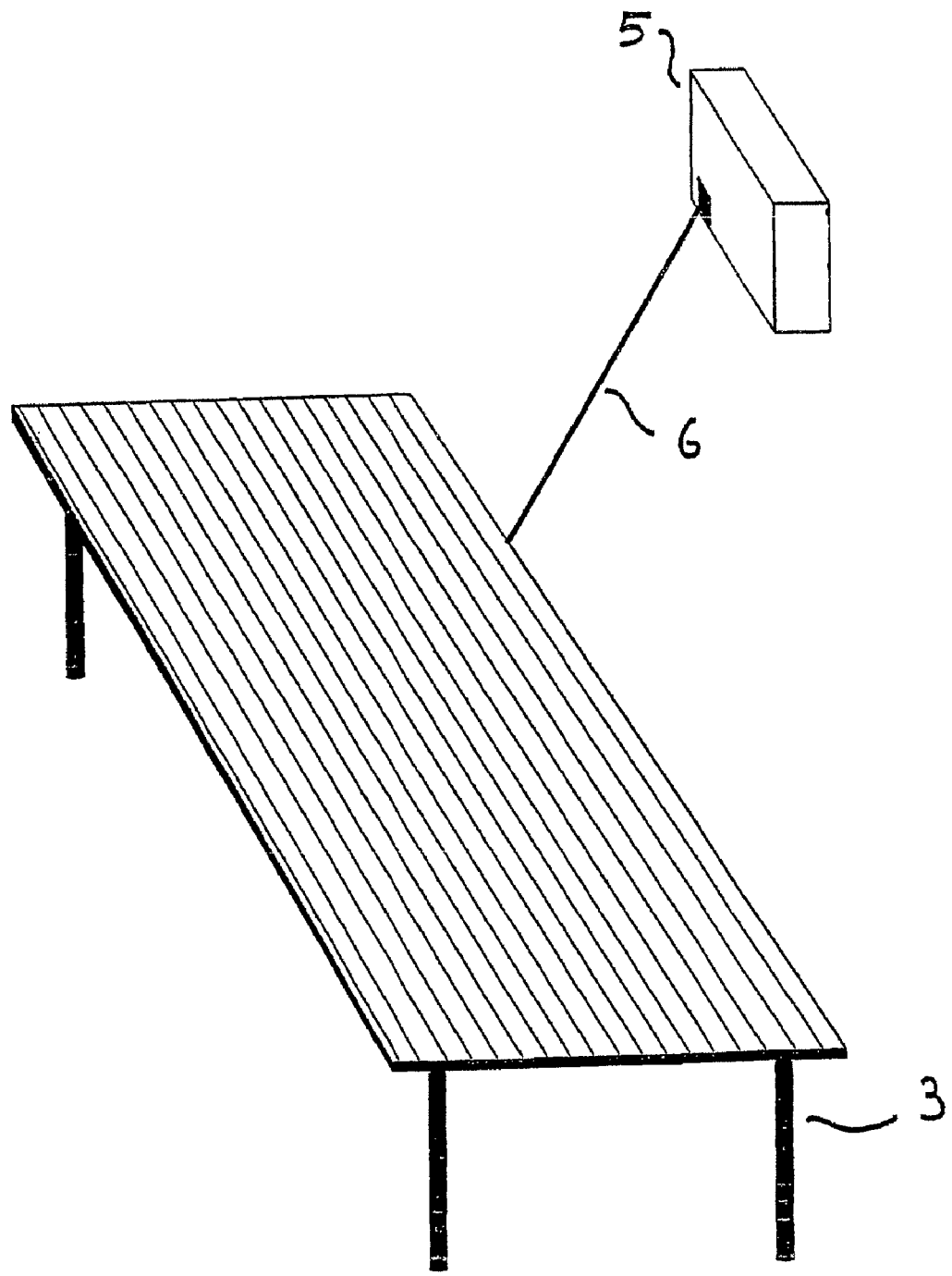
FIG. 3 shows a perspective view of a work bench with a directional radiator aligned therewith, in a row-wise initialization sequence.

FIG. 3 displays a work bench 3 and a directional radiator 5 aligned therewith, in a perspective view. In order to initialize movement tracking, the directional beam sensor of a handling unit 2 is automatically sought by scanning the spatial region defined by the work bench 3. Here, the directional beam is positioned alternately between two extreme positions of an axis, such as for example the longitudinal axis of the work bench 3. A line is produced by switching over the laser point between the extreme positions. At the same time, a second axis of the directional radiator 5 runs through all the values between the extremes of this second axis, which is preferably aligned transverse to the first axis, at a defined rate of growth. This results in an accumulation of lines at a defined spacing. A coordinate of the position of the directional beam sensor 7 is determined as soon as the directional beam 6 of the directional radiator 5 impinges on the directional beam sensor 7. Further coordinates can also be determined in the same way.

The directional beam sensor 7 can, for example, consist of a group of individual sensors for tracking the directional beam 6 onto the moving directional beam sensor 7. The direction of movement is then detected from the displacement of the point of impingement of the directional beam 6 from an individual sensor onto the adjacent individual sensor of the directional beam sensor 7, and the directional beam 6 can track the directional beam sensor 7 by appropriate tilting of the directional radiator 5.

Figure 4:
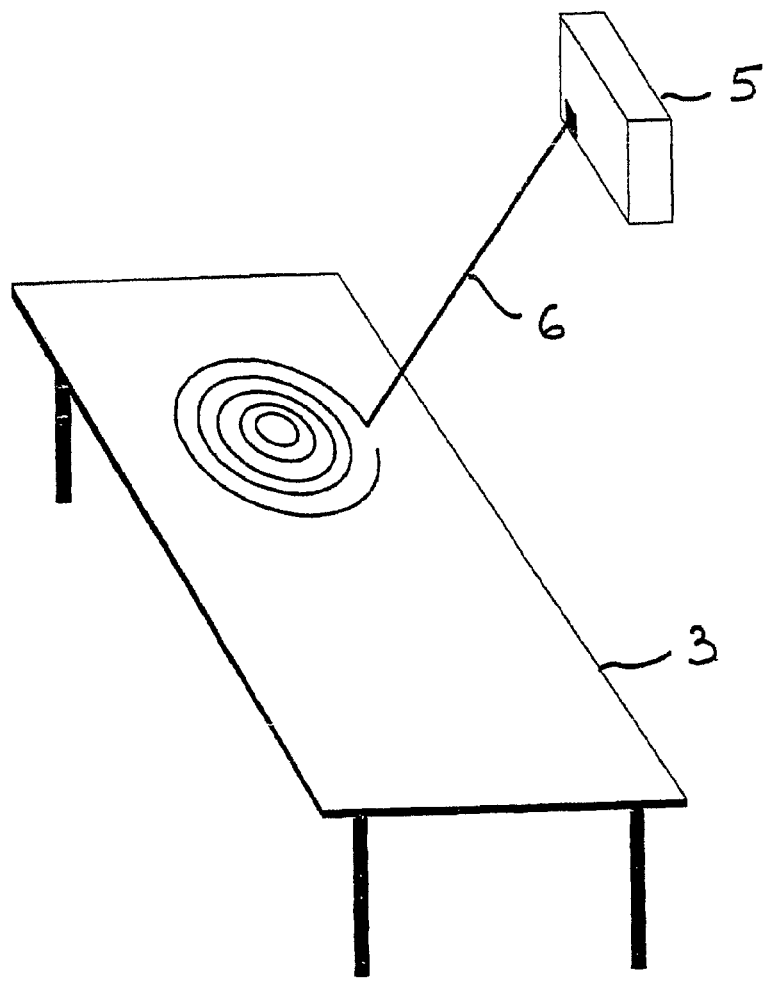
FIG. 4 shows a sketch of a work bench with directional radiator in a circular directional beam path for tracking the movement.

FIG. 4 displays another embodiment of the tracking of the directional beam 6 onto the directional beam sensor 7. When the handling unit 2 and thus the directional beam sensor 7 move, the directional beam 6 is no longer detected by the directional beam sensor 7. Since a movement is performed continuously, it also follows that only a relatively short distance can have been covered in a relatively short space of time. The directional beam sensor 7 therefore has to be located in the immediate vicinity of the previously known position. In order to refind the directional beam sensor 7, the directed radiation can be moved in prescribed geometrical figures such as, for example, circles, spirals, rectangles, etc. with incremental spacing, beginning, for example, with the value zero, this being done about the last known position until the directional beam sensor 7 again detects the directional beam 6. It is thereby possible to calculate the new position of the directional beam sensor 7, and thus of the handling unit 2 or of the tool arranged thereon, and to calculate the movement of the handling unit 2 in a simple way.

Figure 5:
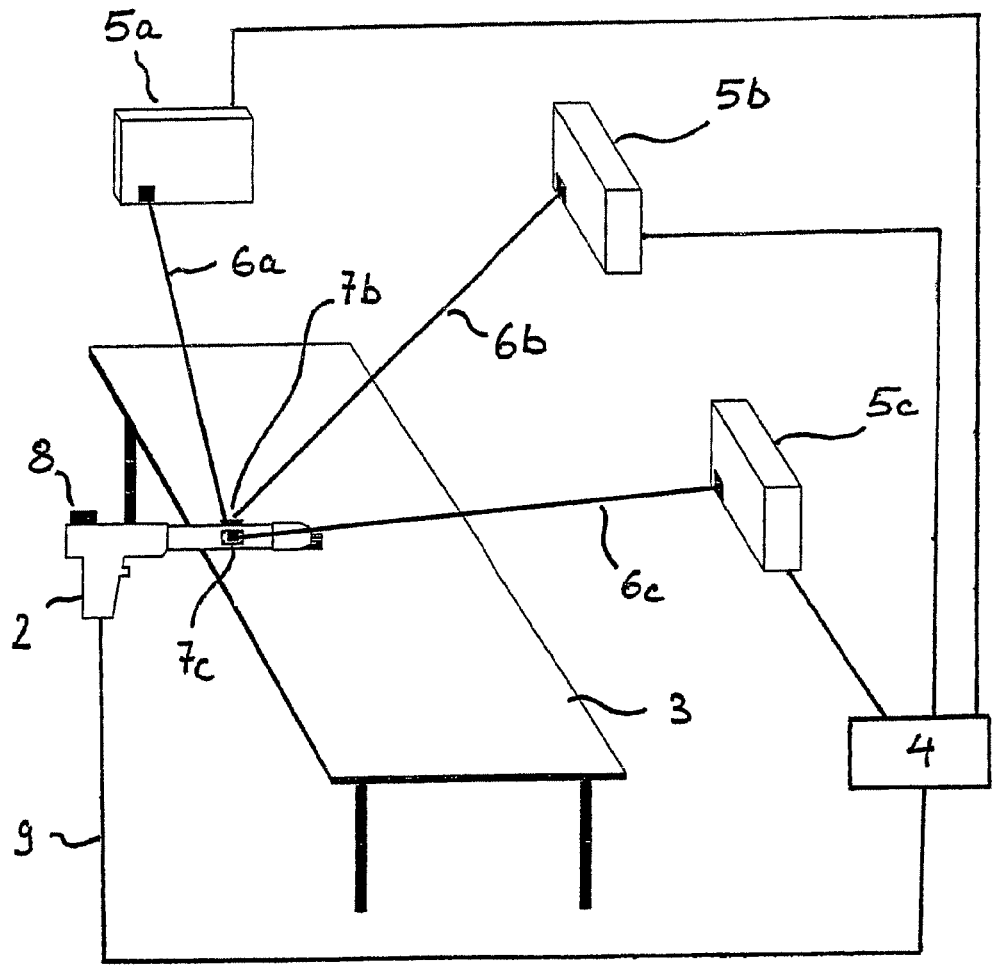
FIG. 5 shows a sketch of a device and three directional radiators aligned therewith for triangulation.

FIG. 5 displays a device 1 with three directional radiators 5a, 5b, 5c that cooperate as a triangulation system. An assigned directional beam sensor 7a (not illustrated, since being concealed), 7b and 7c is provided at each directional radiator 5a, 5b, 5c.

The directional beams 6a, 6b, 6c are preferably mutually distinguishable in order to distinguish the directional radiators 5a, 5b, 5c. This can be performed by coding the directional beams 6a, 6b, 6c or by means of different wavelengths.

The triangulation not only renders it possible to detect the movement of the handling unit 2 with reference to a spatial plane—rather, it is also possible to detect the rotation of the handling unit 2. The additional inertial system with inertial sensor 8 is dispensable per se for the purpose of tracking the complete movement of the tool, but is useful in enabling the movement to continue to be detected in the event of concealment of the point-to-point connection between the directional radiator 5 and an assigned directional beam sensor 7.

The arrangement of the directional beam sensors 7 and inertial sensors 8 on the handling unit 2 is arbitrary in principle if a defined, invariable reference to the tool such as, for example the tip of the handling unit 2, is ensured. Depending on the design of the tool, there may be a need to take account of correction variables that can, for example, be defined in correction matrices in a fashion referred to the tool.

The invention claimed is:

1. A device (1) for tracking the movement of a tool of a handling unit (2) having at least one directional radiator (5) that can be aligned with the tool and be tracked, and a signal evaluation unit (4) for determining the movement, in which
    the directional radiators (5) have, actuators for aligning the directional beam (6) at adjustable angles with reference to a fixed spatial plane, and angle sensors for determining the current directional beam angle with reference to the spatial plane, and the angle sensors are connected to the signal evaluation unit (4),
    direction beam sensors (7) for detecting the directional beam (6) are arranged with a fixed reference to the tool and movably therewith, and are connected to the signal evaluation unit (4), and
    the signal evaluation unit (4) is set up for tracking the directional beam (6) of the at least one directional radiator (5) onto an assigned, moving directional beam sensor (7), and for determining the arbitrary movement of the tool in three-dimensional space as a function of the directional beam angles,
characterized in that at least one inertial sensor (8) is connected to the tool for quantitatively acquiring the acceleration and/or rate of rotation and acquiring the direction of acceleration and/or direction of rotation of the tool and is connected with a signal output to the signal evaluation unit (4), and in that the signal evaluation unit (4) is set up for correcting the movement information determined with the aid of the signals of the inertial sensor (8) by means of the movement information determined with the aid of the directional radiators (5), and for tracking the movement of the tool and/or for tracking the directional radiators (5) as a function of the acceleration and/or rate of rotation signals of the inertial sensor (8).

2. The device (1) as claimed in claim 1, characterized in that the signal evaluation unit (4) is set up for tracking the movement of the tool, and for tracking the directional radiators (5) upon interruption of at least one directional beam (6) as a function of the movement information determined with the aid of the inertial sensor (8).

3. The device (1) as claimed in claim 1, characterized in that the signal evaluation unit (4) is set up for determining the translatory movements of the tool as a function of the detected signals of the directional beam sensors (7), and for determining the rotary movements of the tool as a function of rate of rotation signals of the inertial sensor (8).

4. The device (1) as claimed in claim 1, characterized in that at least one rotational beam sensor (7) is formed from a group of individual sensors arranged next to one another, and in that the signal evaluation unit (4) is set up for tracking the at least one directional radiator (5) as a function of a displacement of the detected directional beam (6) from an individual sensor onto a neighboring individual sensor, and as a function of the known spatial position of the individual sensors relative to one another.

5. The device (1) as claimed in claim 1, characterized in that at least one directional beam sensor (7) is formed from a photosemiconductor surface element with a common anode or cathode, and from a plurality of cathodes or anodes assigned respectively to a surface region of the photosemiconductor surface element, and in that the signal evaluation unit (4) is set up for tracking the at least one directional beam (5) as a function of a displacement of the detected directional beam (6) from a surface region onto a neighboring surface region of the photosemiconductor surface element.

6. The device (1) as claimed in claim 5, characterized in that the photosemiconductor surface element is a photodiode, a phototransistor or an optical sensor.

7. The device (1) as claimed in claim 1, characterized in that the device (1) has exactly one directional radiator (5) for detecting the movement of the tool with reference to a spatial plane.

8. The device (1) of claim 1, characterized in that the device (1) has at least two directional radiators (5) for detecting the movement of the tool in three-dimensional space.

9. The device (1) as claimed in claim 1, characterized in that at least one of the directional radiators (5) is set up for emitting a laser beam, an infrared radiation, an ultrasonic radiation, a microwave radiation or a terahertz radiation.

10. The device (1) as claimed in claim 1, characterized in that the signal evaluation unit (4) is set up for initializing the device (1) by scanning a spatial region with the aid of directional beams (6) of the directional radiator (5) in an alignment sequence for localizing the at least one directional beam sensor (7) of the tool.

11. The device (1) as claimed in claim 10, characterized in that the signal evaluation unit (4) is set up for scanning prescribed geometric figures or for scanning sequentially in time rows of the spatial region running parallel next to one another.

12. The device (1) as claimed in claim 1, characterized in that the signal evaluation unit (4) is set up for recording the tracked movement of the tool in a memory, in particular for storing path curves.

13. The device (1) as claimed in claim 1, characterized in that a plurality of directional radiators (5) are provided that emit directional beams (6) of mutually different wavelengths, modulations and/or codings, and the directional beam sensors (7) and/or the signal evaluation unit (4) are/is set up for selectively detecting the mutually different directional beams (6).

14. The device (1) as claimed in claim 1, characterized in that the handling unit (2) is at least partially hand guided, for example being a hand guided mounting tool, a manual application device or a glue gun.

15. The device (1) as claimed in claim 1, characterized in that the handling unit (2) is a robot, a machine tool and/or a handling machine.

16. A method for tracking the movement of a tool of a handling unit (2) having at least one directional radiator (5) that can be aligned with the tool and be tracked, having the steps of:
 a) aligning the directional beams (6) of the at least one directional radiator (5) at an angle with reference to a fixed spatial plane such that the directional beam (6) is detected by a directional beam sensor (7) arranged with a fixed reference to the tool and movably therewith,
 b) tracking the directional beams (6) with the at least one directional radiator (5) onto the directional beam sensor (7) in the case of a moving tool such that the directional beam (6) continues to be detected by the directional beam sensor (7), and
 c) determining the arbitrary movement of the tool in three-dimensional space as a function of the directional beam angle, which changes in the tracking,
characterized by quantitatively acquiring the acceleration of the tool with the aid of an inertial sensor (8), correcting the movement information determined with the aid of the signals of the inertial sensor (8) by means of the movement information emitted with the aid of the directional radiators (5), and continuing to track the movement of the tool as a function of the acceleration signals of the inertial sensor (8).

17. The method as claimed in claim 16, characterized by detecting the directional beam with the aid of a directional beam sensor (7) that is formed from a group of individual sensors arranged next to one another, evaluating the displacement of the detected directional beam (6) from an individual sensor onto a neighboring individual sensor, and tracking the at least one directional radiator (5) as a function of the detected displacement.

18. The method as claimed in claim 16, characterized by tracking the at least one directional radiator (5) as a function of a displacement of the detected directional beam (6) from a surface region of a photosemiconductor surface element onto a neighboring surface region of the same photosemiconductor surface element.

19. The method as claimed in claim 16, characterized by tracking the directional radiator (5) upon interruption of at least one directional beam (6) as a function of the movement information determined with the aid of the inertial sensor (8).

20. The method as claimed in claim 16, characterized by determining the translatory movement of the tool as a function of the detected signals of the directional beam sensors (7), and determining the rotary movement of the tool as a function of signals of the inertial sensor (8).

21. The method as claimed in claim 16, characterized by preceding initialization of the device by means of scanning a spatial region with the aid of directional beams (6) of the directional radiator (5) in an alignment sequence for localizing the at least one directional beam sensor (7) of the tool.

22. The method as claimed in claim 21, characterized by scanning prescribed geometrical figures, or by scanning sequentially in time rows of the spatial region running parallel next to one another.

23. The method as claimed in claim 16, characterized by recording the tracked movement of the tool in a memory, in particular for storing path curves of the tool.

24. The method as claimed in claim 16, characterized by emitting a plurality of directional beams (6) that have mutually different wavelengths and/or codings, and selectively detecting the mutually different directional beams (6) n rotary tools, between which the material layers (14, 15) can be transported.

\* \* \* \* \*